US012155832B2

(12) United States Patent
Iwamura et al.

(10) Patent No.: US 12,155,832 B2
(45) Date of Patent: Nov. 26, 2024

(54) ENCODING DEVICE, DECODING DEVICE AND PROGRAM

(71) Applicant: NIPPON HOSO KYOKAI, Tokyo (JP)

(72) Inventors: Shunsuke Iwamura, Tokyo (JP); Shimpei Nemoto, Tokyo (JP); Atsuro Ichigaya, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 145 days.

(21) Appl. No.: 17/655,597

(22) Filed: Mar. 21, 2022

(65) Prior Publication Data

US 2022/0210417 A1 Jun. 30, 2022

Related U.S. Application Data

(63) Continuation of application No. PCT/JP2021/014155, filed on Apr. 1, 2021.

(30) Foreign Application Priority Data

Apr. 2, 2020 (JP) ................................ 2020-067047

(51) Int. Cl.
*H04N 19/00* (2014.01)
*H04N 19/124* (2014.01)
(Continued)

(52) U.S. Cl.
CPC ......... *H04N 19/124* (2014.11); *H04N 19/186* (2014.11); *H04N 19/30* (2014.11); *H04N 19/82* (2014.11)

(58) Field of Classification Search
CPC .... H04N 19/124; H04N 19/186; H04N 19/30; H04N 19/82
See application file for complete search history.

(56) References Cited

U.S. PATENT DOCUMENTS

| | | | |
|---|---|---|---|
| 2022/0094936 A1* | 3/2022 | Lai ......................... | H04N 19/18 |
| 2023/0058538 A1* | 2/2023 | Deng ................... | H04N 19/117 |
| 2023/0085937 A1* | 3/2023 | Deshpande ............ | H04N 19/70 |

OTHER PUBLICATIONS

International Search Report issued in PCT/JP2021/014155; mailed Jun. 15, 2021.

(Continued)

*Primary Examiner* — Zhihan Zhou
(74) *Attorney, Agent, or Firm* — Studebaker & Brackett PC (57) ABSTRACT

An encoding device includes: a quantizer configured to perform a quantization process; a loop filter configured to perform an adaptive loop filter process; and an entropy encoder configured to output a bit stream including an adaptive parameter set. The adaptive parameter set includes encoding tool type information indicating which parameter of parameter candidates including one of a scaling list parameter including a parameter of a scaling list that controls the quantization process and an adaptive loop filter parameter including a parameter of a filter coefficient used in the adaptive loop filter process is included in the adaptive parameter set, and a chrominance parameter present flag indicating whether or not a parameter for a chrominance signal is present in the adaptive parameter set, and the chrominance parameter present flag is applied in common to the scaling list parameter and the adaptive loop filter parameter.

4 Claims, 9 Drawing Sheets

(51) Int. Cl.
*H04N 19/186* (2014.01)
*H04N 19/30* (2014.01)
*H04N 19/82* (2014.01)

(56) References Cited

OTHER PUBLICATIONS

Benjamin Bross et al. "Versatile Video Coding (Draft 7)" Joint Video Experts Team (JVET) of ITU-T SG 16 WP 3 and ISO/IEC JTC 1/SC 29/WG 11, 16th Meeting; JVET-P2001-v7; Oct. 1-11, 2019; pp. 1-472; Geneva, Switzerland.
Benjamin Bross et al. "Versatile Video Coding (Draft 8)" Joint Video Experts Team (JVET) of ITU-T SG 16 WP 3 and ISO/IECT JTC 1/SC 29/WG 11, 17th Meeting; JVET-Q2001-v8; Jan. 7-17, 2020; pp. 1-497; Brussels, Belgium.
Ling Li et al. "AHG12: Signaling of Chroma Presence in PPS and APS" Joint Video Experts Team (JVET) of ITU-T SG 16 WP 3 and ISO/IEC JTC 1/SC 29/WG 11, 17th Meeting; JVET-Q0420-v1; Jan. 7-17, 2020; pp. 1-4; Brussels, Belgium.
Karam Naser et al. "AhG 9: APS Cleanup" Joint Video Experts Team (JVET) of ITU-T SG 16 WP 3 and ISO/IEC JTC 1/SC 29/WG 11, 18th Meeting; JVET-R0177; Apr. 15-24, 2020; pp. 1-9; teleconference.
Ling Li et al. "AHG12: on scaling_list_chroma_present_flag in APS" Joint Video Experts Team (JVET) of ITU-T SG 16 WP 3 and ISO/IEC JTC 1/SC 29/WG 11, 18th Meeting; JVET-R0301-v1; Apr. 15-24, 2020; pp. 1-6; teleconference.

\* cited by examiner

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp() | VCL |
| 1 | STSA_NUT | Coded slice of an STSA picture slice_layer_rbsp() | VCL |
| 2 | RADL_NUT | Coded slice of a RADL picture slice_layer_rbsp() | VCL |
| 3 | RASL_NUT | Coded slice of a RASL picture slice_layer_rbsp() | VCL |
| 4..6 | RSV_VCL_4.. RSV_VCL_6 | Reserved non-IRAP VCL NAL unit types | VCL |
| 7 8 | IDR_W_RADL IDR_N_LP | Coded slice of an IDR picture slice_layer_rbsp( ) | VCL |
| 9 | CRA_NUT | Coded slice of a CRA picture slice_layer_rbsp( ) | VCL |
| 10 | GDR_NUT | Coded slice of a GDR picture slice_layer_rbsp( ) | VCL |
| 11 12 | RSV_IRAP_11 RSV_IRAP_12 | Reserved IRAP VCL NAL unit types | VCL |
| 13 | DCI_NUT | Decoding capability information decoding_capability_infomation_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 18 | PREFIX_APS_NUT SUFFIX_APS_NUT | Adaptation parameter set adaptation_parameter_set_rbsp( ) | non-VCL |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 24 | PREFIX_SEI_NUT SUFFIX_SEI_NUT | Supplemental enhancement infomation sei_rbsp( ) | non-VCL |
| 25 | FD_NUT | Filler data filler_data_rbsp( ) | non-VCL |
| 26 27 | RSV_NVCL_26 RSV_NVCL_27 | Reserved non-VCL NAL unit types | non-VCL |
| 28..31 | UNSPEC_28.. UNSPEC_31 | Unspecified non-VCL NAL unit types | non-VCL |

| adaptation_parameter_set_rbsp( ) { | Descriptor |
|---|---|
| adaptation_parameter_set_id | u(5) |
| *chroma_aps_present_flag* | *u(1)* |
| aps_params_type | u(3) |
| if ( aps_params_type = = ALF_APS ) | |
|    alf_data*( chroma_aps_present_flag )* | |
| else if ( aps_params_type = = LMCS_APS ) | |
|    lmcs_data( ) | |
| else if ( aps_params_type = = SCALING_APS ) | |
|    scaling_list_data*( chroma_aps_present_flag )* | |
| aps_extension_flag | u(1) |
| if( aps_extension_flag ) | |
|    while( more_rbsp_data( ) ) | |
|       aps_extension_data_flag | u(1) |
| rbsp_trailing_bits( ) | |
| } | |

FIG. 6

| alf_data( chroma_aps_present_flag) { | Descriptor |
|---|---|
| alf_luma_filter_signal_flag | u(1) |
| if (chroma_aps_present_flag) { | |
|     alf_chroma_filter_signal_flag | u(1) |
|     alf_cc_cb_filter_signal_flag | u(1) |
|     alf_cc_cr_filter_signal_flag | u(1) |
| } | |
| ... | |

FIG. 7

| | Descriptor |
|---|---|
| scaling_list_data( *chroma_aps_present_flag* ) { | |
|   scaling_matrix_for_lfnst_disabled_flag | u(1) |
|   ~~scaling_list_chroma_present_flag~~ | ~~u(1)~~ |
|   for( id= 0; id < 28; id ++) | |
|     matrixSize = (id<2) ? 2 : ((id<8) ? 4 : 8) | |
|     if( ~~scaling_list_chroma_present_flag~~ *chroma_aps_present_flag* || ( id % 3 = = 2) <br>     || (id = = 27 ) ) { | |
|       scaling_list_copy_mode_flag[ id ] | u(1) |

| adaptation_parameter_set_rbsp( ) { | Descriptor |
|---|---|
| adaptation_parameter_set_id | u(5) |
| aps_params_type | u(3) |
| if ( aps_params_type != LMCS_APS ) | |
|    *chroma_aps_present_flag* | u(1) |
| if ( aps_params_type == ALF_APS ) | |
|    alf_data( *chroma_aps_present_flag* ) | |
| else if ( aps_params_type == LMCS_APS ) | |
|    lmcs_data( ) | |
| else if ( aps_params_type == SCALING_APS ) | |
|    scaling_list_data( *chroma_aps_present_flag* ) | |
| aps_extension_flag | u(1) |
| if( aps_extension_flag ) | |
|    while( more_rbsp_data( ) ) | |
|      aps_extension_data_flag | u(1) |
| rbsp_trailing_bits( ) | |
| } | |

ENCODING DEVICE, DECODING DEVICE AND PROGRAM

RELATED APPLICATIONS

The present application is a continuation based on PCT Application No. PCT/JP2021/014155, filed on Apr. 1, 2021, which claims the benefit of Japanese Patent Application No. 2020-067047 filed on Apr. 2, 2020. The content of which is incorporated by reference herein in their entirety.

TECHNICAL FIELD

The present invention relates to an encoding device, a decoding device, and a program.

BACKGROUND ART

In a standards proposal of VVC (Versatile Video Coding) which is a next-generation video encoding scheme, a syntax structure called an adaptation parameter set (APS) has been introduced. The APS is a syntax structure for transmitting parameters of functions requiring transmission of relatively many parameters among functions defined in the video encoding scheme.

Such functions include an adaptive loop filter (ALF), LMCS (Luma Mapping and Chroma Scaling) and a quantization process. Specifically, the APS includes a parameter of a filter coefficient used in an ALF process, a parameter for the LMCS and a parameter of a scaling list which controls the quantization process.

The parameter of the scaling list includes a parameter of the scaling list corresponding to a luminance signal and a parameter of the scaling list corresponding to a chrominance signal. Here, when a chroma format of a sequence is 4:0:0 (monochrome), an encoding device does not need to signal the parameter of the scaling list corresponding to the chrominance signal since the chrominance signal is not present. However, information of the chroma format is included in SPS and the APS cannot refer to the information of the chroma format so that the encoding device signals even the parameter of the scaling list for the chrominance signal which is not utilized. (See Non Patent Literature 1).

Then, in Non Patent Literature 2, a method for avoiding such redundant signaling is introduced. Specifically, the encoding device signals a flag (Scaling_list_chroma_present_flag) indicating whether or not the scaling list corresponding to the chrominance signal is present in the syntax structure of the scaling list and signals the parameter of the scaling list corresponding to the chrominance signal only when the flag is true.

CITATION LIST

Non Patent Literature

Non Patent Literature 1: JVET-P2001 "Versatile Video Coding (Draft 7)"
Non Patent Literature 2: JVET-Q2001 "Versatile Video Coding (Draft 8)"

DISCLOSURE OF INVENTION

An encoding device according to a first feature includes: a quantizer configured to perform a quantization process; a loop filter configured to perform an adaptive loop filter process; and an entropy encoder configured to output a bit stream including an adaptive parameter set, wherein the adaptive parameter set includes encoding tool type information indicating which parameter of parameter candidates including one of a scaling list parameter including a parameter of a scaling list that controls the quantization process and an adaptive loop filter parameter including a parameter of a filter coefficient used in the adaptive loop filter process is included in the adaptive parameter set, and a chrominance parameter present flag indicating whether or not a parameter for a chrominance signal is present in the adaptive parameter set, and the chrominance parameter present flag is applied in common to the scaling list parameter and the adaptive loop filter parameter.

A decoding device according to a second feature includes: an entropy decoder configured to acquire a bit stream including an adaptive parameter set; an inverse quantizer configured to perform an inverse quantization process; and a loop filter configured to perform an adaptive loop filter process, wherein the adaptive parameter set includes encoding tool type information indicating which parameter of parameter candidates including one of a scaling list parameter including a parameter of a scaling list that controls the inverse quantization process and an adaptive loop filter parameter including a parameter of a filter coefficient used in the adaptive loop filter process is included in the adaptive parameter set, and a chrominance parameter present flag indicating whether or not a parameter for a chrominance signal is present in the adaptive parameter set, and the chrominance parameter present flag is applied in common to the scaling list parameter and the adaptive loop filter parameter.

A program according to a third feature causes a computer to function as the encoding device according to the first feature.

A program according to a fourth feature causes a computer to function as the decoding device according to the second feature.

BRIEF DESCRIPTION OF DRAWINGS

FIG. 3 is a diagram illustrating types of an NAL unit according to the embodiment.

DESCRIPTION OF EMBODIMENTS

The method described in Non Patent Literature 2 can avoid redundant signaling regarding a parameter of a scaling list corresponding to a chrominance signal, but there is a problem that similar redundant signaling in other APS parameters is not solved yet.

Accordingly, an object of the present disclosure is to enhance encoding efficiency by avoiding redundant signaling.

An encoding device and a decoding device according to an embodiment are described with reference to the accompanying drawings. The encoding device and the decoding device according to the embodiment encode and decode videos such as MPEG (Moving Picture Experts Group) videos. In the description of the drawings below, the same or similar reference signs are used for the same or similar parts.

<Encoding Device>
(Configuration of Encoding Device)

Figure 1:
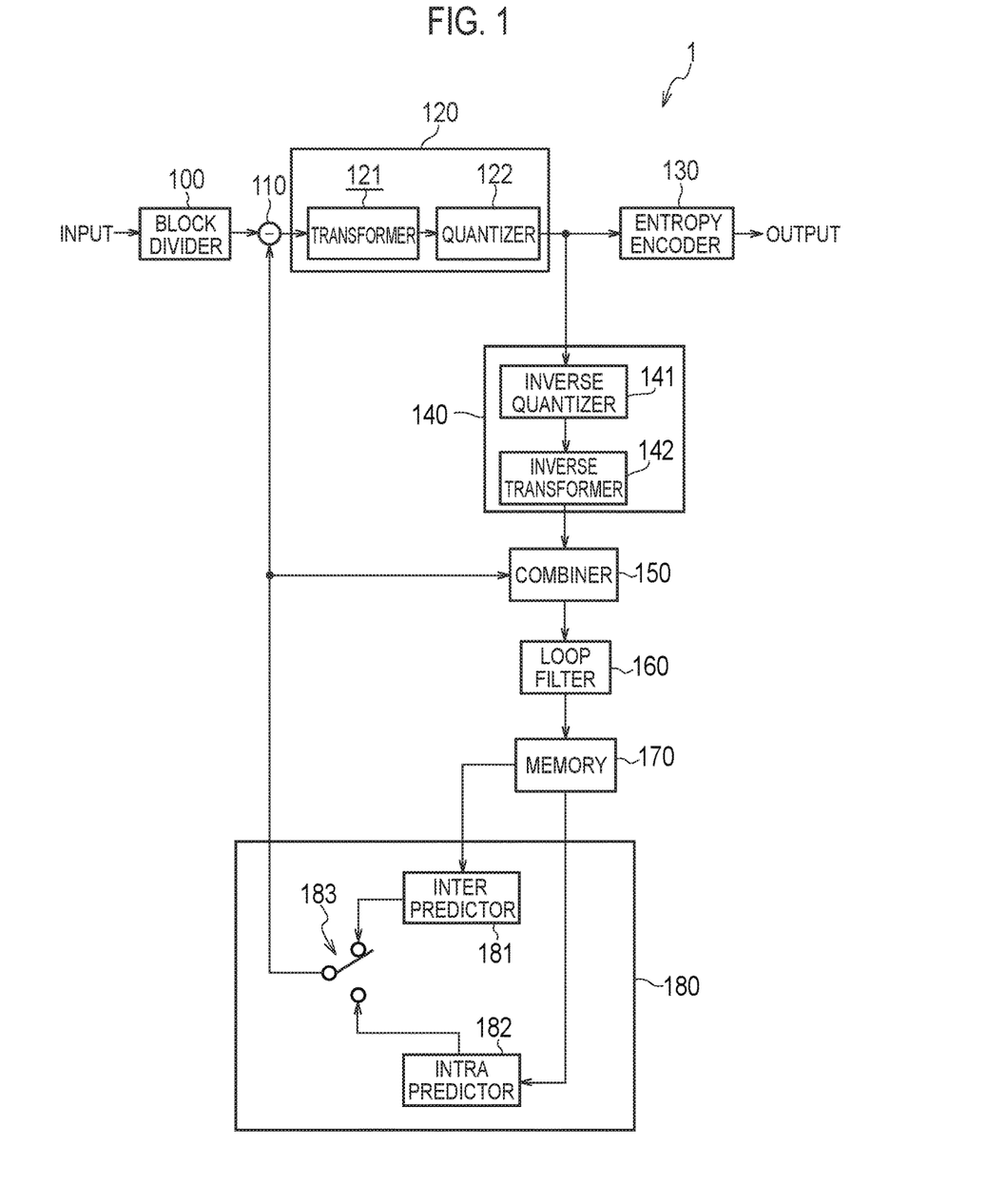
FIG. 1 is a diagram illustrating the configuration of an encoding device according to an embodiment.

A configuration of an encoding device according to the present embodiment will be described first. FIG. 1 is a diagram illustrating a configuration of an encoding device 1 according to the present embodiment.

As illustrated in FIG. 1, the encoding device 1 includes a block divider 100, a residual generator 110, a transformer/quantizer 120, an entropy encoder 130, an inverse quantizer/inverse transformer 140, a combiner 150, a loop filter 160, a memory 170, and a predictor 180.

The block divider 100 divides an original image which is an input image in frame (or picture) units that constitutes a video into a plurality of image blocks and outputs the image blocks obtained by division to the residual generator 110. The size of the image blocks may be 32×32 pixels, 16×16 pixels, 8×8 pixels, or 4×4 pixels. The shape of the image blocks is not limited to square and may be rectangular (non-square). The image block is a unit (encoding-target block) in which the encoding device 1 performs encoding and is a unit (decoding-target block) in which a decoding device performs decoding. Such an image block is sometimes referred to as a CU (Coding Unit).

The block divider 100 outputs a luminance block and a chrominance block by performing block division on a luminance signal and a chrominance signal that constitute an image. The division may be controllable independently for the luminance signal and the chrominance signal. In a following description of the encoding device, the luminance block and the chrominance block are simply referred to as an encoding-target block when the blocks are not particularly distinguished from each other.

The residual generator 110 calculates a prediction residual that represents a difference (error) between an encoding-target block outputted from the block divider 100 and a prediction block obtained by the predictor 180 predicting the encoding-target block. Specifically, the residual generator 110 calculates the prediction residual by subtracting each pixel value in the prediction block from each pixel value in the encoding-target block, and outputs the calculated prediction residual to the transformer/quantizer 120.

The transformer/quantizer 120 executes a transform process and a quantization process on each of blocks. The transformer/quantizer 120 includes a transformer 121 and a quantizer 122.

The transformer 121 calculates transform coefficients by performing the transform process on the prediction residual outputted from the residual generator 110, and outputs the calculated transform coefficients to the quantizer 122. The transform process is a process of transforming the prediction residual from a spatial domain to a frequency domain, and includes, for example, discrete cosine transform (DCT), discrete sine transform (DST) and/or Karhunen Loeve transform (KLT). The transform process may include a transform skip of performing adjustment by scaling or the like without transforming a pixel-domain signal to the frequency domain. The transformer 121 outputs information regarding the transform process applied to the encoding target block to the entropy encoder 130.

The quantizer 122 quantizes the transform coefficients outputted from the transformer 121 by using a quantization parameter and a quantization matrix, and outputs the quantized transform coefficients to the entropy encoder 130 and the inverse quantizer/inverse transformer 140. In addition, the quantizer 122 outputs information regarding the quantization process (specifically the information of the quantization parameter and the quantization matrix used in the quantization process) to the entropy encoder 130 and an inverse quantizer 141.

Here, the quantization parameter is a parameter for which one value is set for one block. Specifically, the quantization parameter is a parameter that is applied in common to each transform coefficient in a block, and is a parameter that determines quantization granularity (step size).

The quantization matrix is a matrix including values set for each component in one block. Specifically, the quantization matrix is a matrix including values (weighted coefficients) set for each component of i×j elements corresponding to a block size, and is used for adjusting the quantization granularity for each component from a low frequency to a high frequency of the transform coefficients. A list including the values constituting the quantization matrix is referred to as a scaling list. The scaling list is signaled from an encoding side to a decoding side. Note that the scaling list for the luminance signal and the scaling list for the chrominance signal can be set so as to be different from each other.

The entropy encoder 130 performs entropy encoding on the quantized transform coefficients outputted from the quantizer 122, generates encoded data (bit stream) by performing data compression, and outputs the encoded data to an outside of the encoding device 1. For the entropy encoding, Huffman coding and/or CABAC (Context-based Adaptive Binary Arithmetic Coding) or the like can be used. Details of the bit stream outputted from the entropy encoder 130 will be described later.

In addition, the entropy encoder 130 encodes the information regarding the transform process inputted from the transformer 121, outputs the bit stream and transmits (signals) it to the decoding side. Further, the entropy encoder 130 encodes information regarding a prediction process inputted from the predictor 180, outputs the bit stream and transmits it to the decoding side.

The inverse quantizer/inverse transformer 140 executes an inverse quantization process and an inverse transform process on each of blocks. The inverse quantizer/inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes the transform coefficients outputted from the quantizer 122 by using the quantization parameter (Qp) and the quantization matrix to restore the transform coefficients, and outputs the restored transform coefficients to the inverse transformer 142.

The inverse transformer 142 performs the inverse transform process corresponding to the transform process performed by the transformer 121 based on transform type information outputted from the transformer 121. For example, when the transformer 121 performs the discrete cosine transform, the inverse transformer 142 performs inverse discrete cosine transform. The inverse transformer 142 restores the prediction residual by performing the inverse transform process on the transform coefficients outputted from the inverse quantizer 141, and outputs a restoration prediction residual that is the restored prediction residual to the combiner 150.

The combiner 150 combines the restoration prediction residual outputted from the inverse transformer 142 with a prediction block outputted from the predictor 180 in pixel units. The combiner 150 decodes (reconstructs) an encoding-target block by adding individual pixel values of the restoration prediction residual to individual pixel values of the prediction block, and outputs a decoded block to the loop filter 160. The decoded block is sometimes referred to as a reconstructed block.

The loop filter 160 performs a filter process on the decoded block outputted from the combiner 150 and outputs the decoded block after the filter process to the memory 170. In the present embodiment, the loop filter 160 performs an adaptive loop filter (ALF) process. The loop filter 160 performs the ALF process using filter coefficients different from each other for the luminance signal and the chrominance signal. The ALF process for the chrominance signal includes CCALF (Cross-component ALF) that is the ALF process using a color correlation in the chrominance signal. The CCALF includes CCALF on a first component (Cb signal) of the chrominance signal and CCALF on a second component (Cr signal) of the chrominance signal. The filter coefficients used in the ALF process are signaled from the encoding side to the decoding side. Note that the filter coefficient for the luminance signal and the filter coefficient for the chrominance signal can be set so as to be different from each other.

The memory 170 stores the decoded block after the filter process outputted from the loop filter 160 and accumulates the decoded block as decoded images in frame units. The memory 170 outputs the stored decoded block or decoded images to the predictor 180.

The predictor 180 performs the prediction process in block units. The predictor 180 includes an inter predictor 181, an intra predictor 182 and a switcher 183.

The inter predictor 181 performs inter prediction utilizing an inter-frame correlation. Specifically, the inter predictor 181 calculates a motion vector through a scheme such as block matching by using the decoded image stored in the memory 170 as a reference image, generates an inter prediction block by predicting the encoding-target block, and outputs the generated inter prediction block to the switcher 183. Here, the inter predictor 181 selects an optimal inter prediction method from inter prediction using a plurality of reference images (typically, bi-prediction) and/or inter prediction using one reference image (uni-directional prediction), and performs the inter prediction by using the selected inter prediction method. The inter predictor 181 outputs information regarding the inter prediction (the motion vector and the like) to the entropy encoder 130.

The intra predictor 182 performs intra prediction utilizing an intra-frame spatial correlation. Specifically, the intra predictor 182 generates an intra prediction block by referring to decoded pixels present around the encoding-target block of the decoded image stored in the memory 170, and outputs the generated intra prediction block to the switcher 183. The intra predictor 182 selects an intra prediction mode to be applied to the encoding-target block from among a plurality of intra prediction modes, and predicts the encoding-target block by using the selected intra prediction mode.

The switcher 183 switches the inter prediction block outputted from the inter predictor 181 and the intra prediction block outputted from the intra predictor 182 and outputs one of the prediction blocks to the residual generator 110 and the combiner 150.

The encoding device 1 may include a functional unit for performing an LMCS (Luma mapping and chroma scaling) process. In the LMCS process, a value of the luminance signal of the original image is changed by a mapping process using a lookup table (conversion table) before performing the process such as the prediction process and/or the transform process according to a signal characteristic of the input image, and the prediction process, the transform process and the quantization process are applied on the luminance signal after mapping. In addition, the value of the chrominance signal of the original image is changed by a scaling process according to the value of the luminance signal of the original image, and the prediction process, the transform process and the quantization process are applied on the chrominance signal after scaling.

(Configuration of Bit Stream)

Figure 2A:
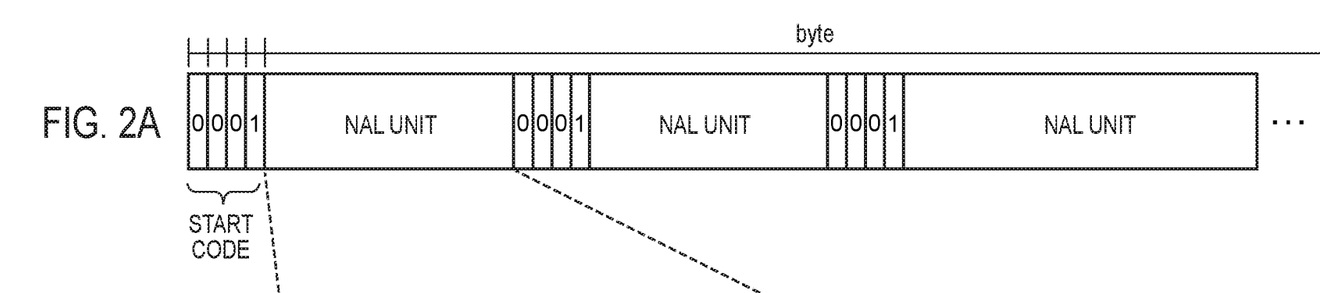
FIG. 2A is a diagram illustrating a configuration of a bit stream according to the embodiment.
Figure 2B:
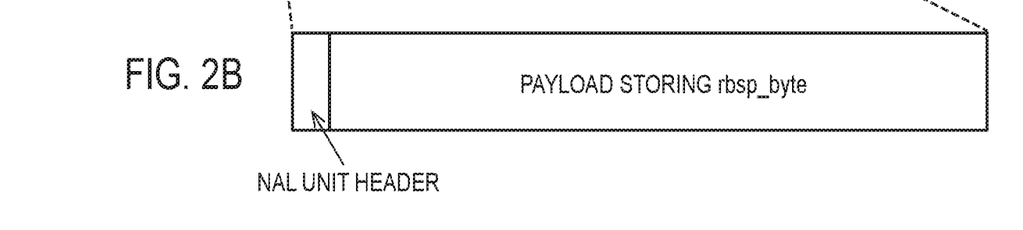
FIG. 2B is a diagram illustrating a configuration of a bit stream according to the embodiment.

Next, a configuration of a bit stream outputted from the entropy encoder 130 according to the present embodiment will be described. FIG. 2A and FIG. 2B are diagrams illustrating a configuration of a bit stream according to the present embodiment.

As illustrated in FIG. 2A, a bit stream includes a plurality of NAL units and start codes provided at a head of each NAL unit. The start code has 4 bytes and is controlled such that the 0001 (=0x00000001) is not generated in the NAL unit. As illustrated in FIG. 2B, each NAL unit includes an NAL unit header and a payload.

FIG. 3 is a diagram illustrating types of the NAL unit. The types of the NAL unit are identified by nal_unit_type in an NAL unit header. The types of the NAL unit are classified into a VCL (Video Coding Layer) class and a non-VCL class. The VCL class is a class corresponding to an encoded bit stream of a slice including an encoding target CTU (Coding Tree Unit). The non-VCL class is a class corresponding to control information required for decoding, such as a VPS (Video Parameter Set), an SPS (Sequence Parameter Set), a PPS (Picture Parameter Set) and an APS (Adaptation Parameter Set). The VPS, the SPS, the PPS and the APS are signaled by different NAL units respectively.

Figure 4:
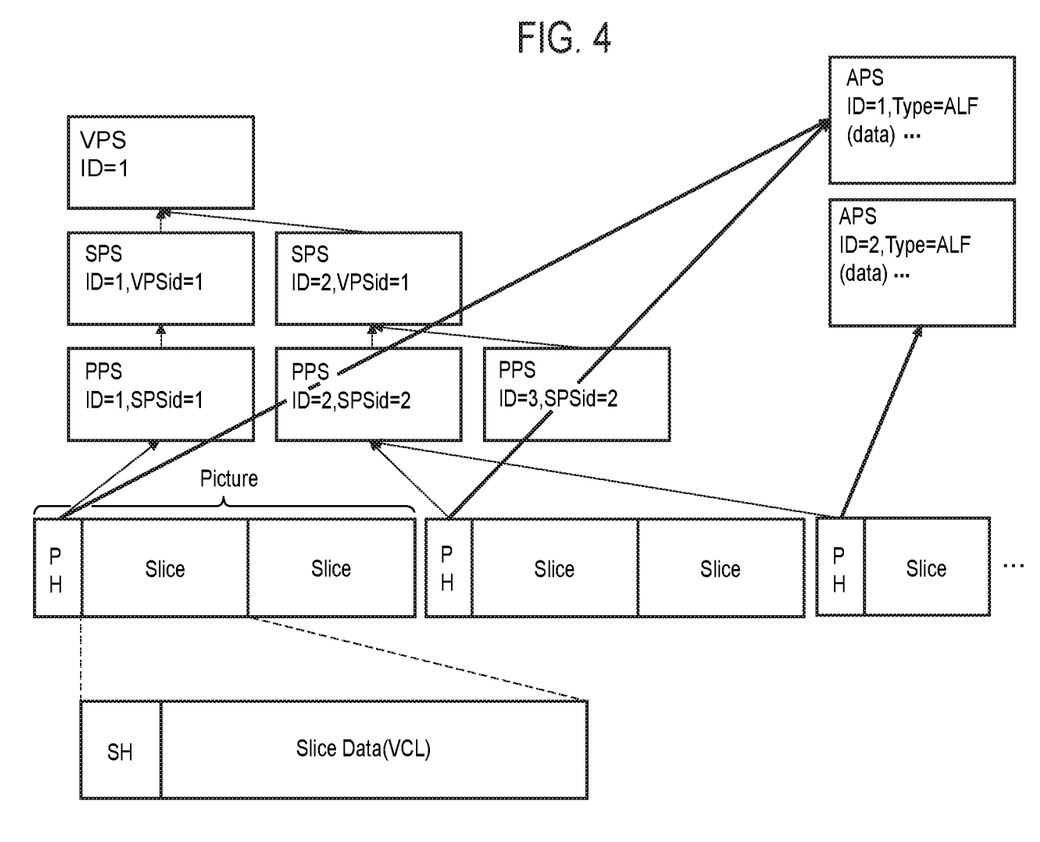
FIG. 4 is a diagram illustrating a relation of a VPS, an SPS, a PPS and an APS according to the embodiment.

FIG. 4 is a diagram illustrating a relation of the VPS, the SPS, the PPS and the APS according to the present embodiment.

As illustrated in FIG. 4, the VPS has its own ID (vps_video_parameter_set_id) and is referred to from the SPS. The VPS stores information regarding the entire decoding of the bit stream. For example, the VPS includes information of a maximum number of layers and a DPB (Decoded Picture Buffer) or the like.

The SPS has its own ID (sps_seq_parameter_set_id) and is referred to from the PPS. In addition, the SPS has an ID (sps_video_parameter_set_id) of the VPS that the SPS itself refers to. The SPS stores information required for decoding a sequence. For example, the SPS includes information of a chroma format, a maximum width/height, a bit depth, sub-picture information (a number, start coordinates of each subpicture, a width and a height or the like), ON/OFF control in sequence units of each encoding tool (each function) and/or VUI (Video usability information) or the like. The information of the ON/OFF control in sequence units includes a flag (sps_scaling_list_enabled_flag) indicating whether or not to apply the scaling list.

The PPS has its own ID (pps_pic_parameter_set_id) and is referred to from a PH (Picture Header). In addition, the PPS has an ID (pps_seq_parameter_set_id) of the SPS that the PPS itself refers to. The PPS stores information required for decoding a picture. For example, the PPS includes information of a width/height of the picture, tile division information (definitions such as numbers of vertical and horizontal tiles and the width/height of each row/column), slice division information (a slice division shape (rect/non-rect) and/or the number of tiles in a width/height direction of each rect in the case of the rect) or the like.

The PH is header information for each picture. The slice in the picture refers to the PH. The slice can implicitly discriminate the picture including itself so that it is not required to define an ID of the PH. On the other hand, the PH holds an ID (ph_pic_parameter_set_id) of the PPS that is a referent. The PH stores control information for the picture. For example, the PH includes information of the ON/OFF control of each encoding tool (each function) for the picture or the like. The PH includes information indicating application ON/OFF of respective tools of the ALF, the LMCS and the scaling list. The information of the ON/OFF control in picture units includes a flag (ph_scaling_list_present_flag) indicating whether or not to apply the scaling list. In the case of applying at least one tool, the PH includes an ID of the APS storing parameter information of the tool.

The APS is a syntax structure for parameter transmission for an encoding tool requiring transmission of relatively many parameters such as the ALF, the LMCS and/or the scaling list. The APS holds its own ID and the ID is referred to from the PH.

(Operation of Encoding Device)

Next, an operation of the encoding device 1 according to the present embodiment will be described.

Figure 5:
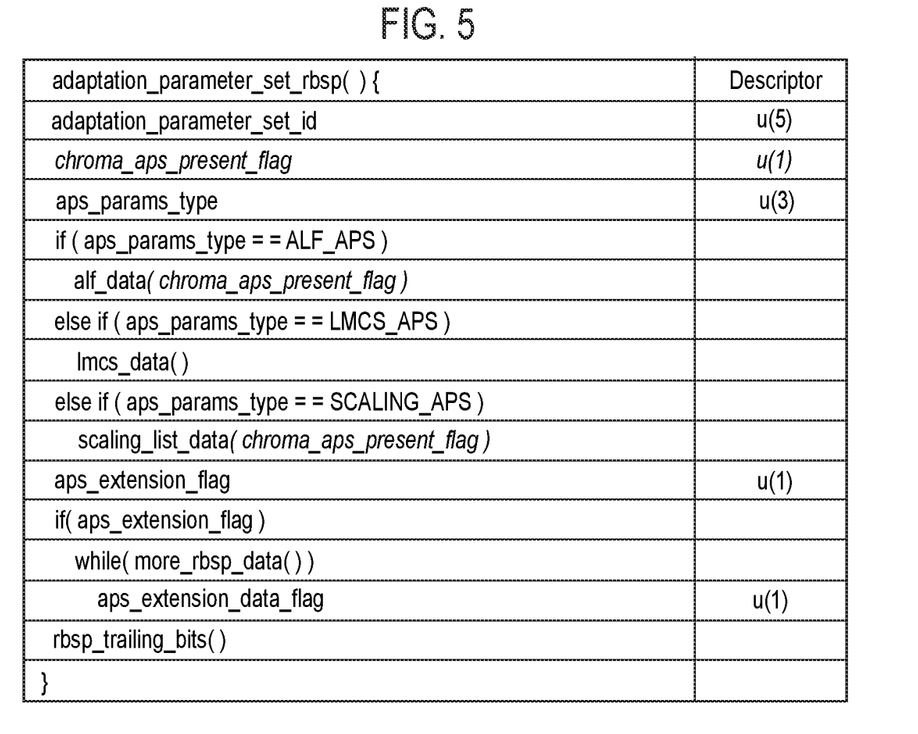
FIG. 5 is a diagram illustrating the APS according to the embodiment.

The encoding device 1 includes, as described above, the quantizer 122 that performs the quantization process, the loop filter 160 that performs the ALF process, and the entropy encoder 130 that outputs the bit stream including an adaptation parameter set (APS). FIG. 5 is a diagram illustrating the APS according to the present embodiment.

As illustrated in FIG. 5, adaptation_parameter_set_rbsp( ) of the APS includes adaptation_parameter_set_id that is the ID of the APS, chroma_aps_present_flag that is a flag indicating whether or not the parameter for the chrominance signal is present in the APS, and aps_params_type that is information indicating a type of the encoding tool (function) for which the parameter is included in the APS. In the present embodiment, the chroma_aps_present_flag corresponds to a chrominance parameter present flag. Note that the adaptation_parameter_set_id has 5 bits, the chroma_aps_present_flag has 1 bit and the aps_params_type has 3 bits.

The aps_params_type is one of "ALF_APS" indicating that the type of the encoding tool for which the parameter is included in the APS is the ALF, "LMCS_APS" indicating that the type of the encoding tool for which the parameter is included in the APS is the LMCS and "SCALING_APS" indicating that the type of the encoding tool for which the parameter is included in the APS is the scaling list. In the present embodiment, the aps_params_type corresponds to encoding tool type information.

When the aps_params_type is "ALF_APS", the APS includes an ALF parameter (alf_data) including a parameter of the filter coefficient used in the ALF process. To the ALF parameter (alf_data), the chroma_aps_present_flag is applied. Specifically, the chroma_aps_present_flag is applied as an argument to the ALF parameter (alf_data) and contents of the ALF parameter (alf_data) are changed according to whether the chroma_aps_present_flag is true ("1") or false ("0"). Thus, a parameter amount included in the ALF parameter (alf_data) is reduced by using the chroma_aps_present_flag. In the present embodiment, an example of applying the chroma_aps_present_flag as an argument of the ALF parameter (alf_data) is described, however, the configuration may be such that the decoded chroma_aps_present_flag is held in a decoding device and referred to in the ALF parameter (alf data). For example, the configuration may be such that a value of the decoded chroma_aps_present_flag is stored in an area ChromaApsPresentFlag in a memory of the decoding device and the contents of the ALF parameter (alf_data) are changed by referring to the ChromaApsPresentFlag in decoding of the ALF parameter (alf_data).

When the aps_params_type is "LMCS_APS", the APS includes an LMCS parameter (lmcs_data) including a parameter for controlling the LMCS process.

When the aps_params_type is "SCALING_APS", the APS includes a scaling list parameter (scaling_list_data) including a parameter of the scaling list that controls the quantization process. To the scaling list parameter (scaling_list_data), the chroma_aps_present_flag is applied. Specifically, the chroma_aps_present_flag is applied as an argument to the scaling list parameter (scaling_list_data) and contents of the scaling list parameter (scaling_list_data) are changed according to whether the chroma_aps_present_flag is true ("1") or false ("0"). Thus, a parameter amount included in the scaling list parameter (scaling_list_data) is reduced by using the chroma_aps_present_flag. In the present embodiment, an example of applying the chroma_aps_present_flag as an argument of the scaling list parameter (scaling_list_data) is described, however, the configuration may be such that the decoded chroma_aps_present_flag is held in the decoding device and referred to in the scaling list parameter (scaling_list_data). For example, the configuration may be such that the value of the decoded chroma_aps_present_flag is stored in the area ChromaApsPresentFlag in the memory of the decoding device and the contents of the scaling list parameter (scaling_list_data) are changed by referring to the ChromaApsPresentFlag in decoding of the scaling list parameter (scaling_list_data).

In this way, in the present embodiment, the chroma_aps_present_flag that is the flag indicating whether or not the parameter for the chrominance signal is present in the APS is applied in common to the ALF parameter (alf_data) and the scaling list parameter (scaling_list_data). Thus, a flag amount can be reduced compared to the case of separately providing the flag indicating whether or not the parameter for the chrominance signal is present in the APS for the ALF parameter (alf_data) and the scaling list parameter (scaling_list_data).

The APS includes aps_extension_flag for future extension. The chroma_aps_present_flag is further applicable to a parameter of a new encoding tool to be extended in future.

Figure 6:
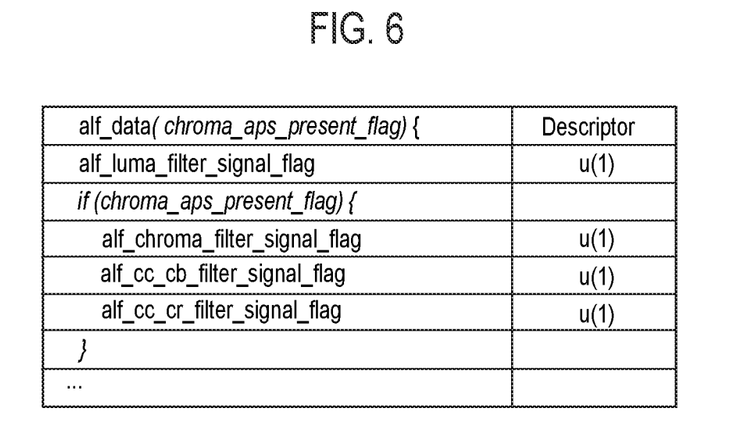
FIG. 6 is a diagram illustrating an ALF parameter (alf_data) according to the embodiment.

FIG. 6 is a diagram illustrating the ALF parameter (alf_data) according to the present embodiment.

As illustrated in FIG. 6, the ALF parameter (alf_data) includes alf_luma_filter_signal_flag indicating whether or not the ALF parameter for the luminance signal is present in the APS. The alf_luma_filter_signal_flag is a 1-bit flag that is present regardless of the chroma_aps_present_flag.

The ALF parameter (alf_data) includes three flags indicating whether or not the ALF parameter for the chrominance signal is present in the APS when the chroma_aps_present_flag is true ("1"). The three flags correspond to chrominance filter parameter present flags.

Specifically, the three flags are alf_chroma_filter_signal_flag indicating whether or not to apply the ALF to the chrominance signal, alf_cc_cb_filter_signal_flag indicating whether or not to apply the ALF (CCALF) using the color correlation to the Cb signal of the chrominance signal and alf_cc_cr_filter_signal_flag indicating whether or not to apply the CCALF to the Cr signal of the chrominance signal.

On the other hand, when the chroma_aps_present_flag is false ("0"), the ALF parameter (alf_data) does not include the three flags indicating whether or not the ALF parameter for the chrominance signal is present in the APS. Thus, the flag amount can be reduced. For example, when the chroma forma is 4:0:0 (monochrome), by setting the chroma_aps_present_flag to be false ("0"), the three bits corresponding to the flags can be reduced.

Figure 7:
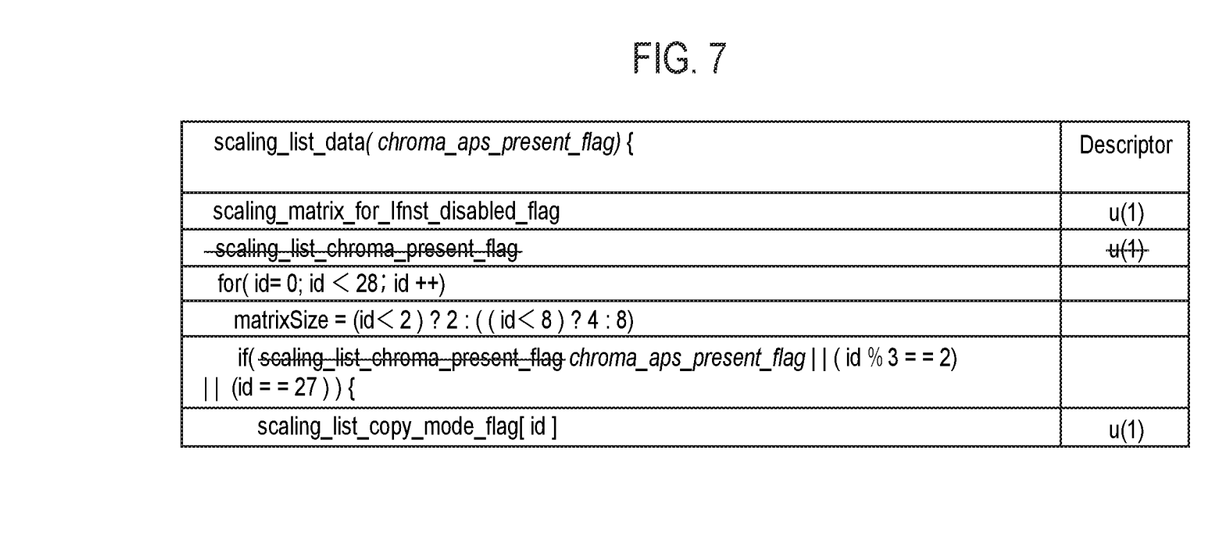
FIG. 7 is a diagram illustrating a scaling list parameter (scaling_list_data) according to the embodiment.

FIG. 7 is a diagram illustrating the scaling list parameter (scaling_list_data) according to the present embodiment. Strikethroughs in FIG. 7 indicate parts deleted from the scaling list parameter (scaling_list_data) described in Non Patent Literature 2.

As illustrated in FIG. 7, the scaling list parameter (scaling_list_data) includes scaling_matrix_for_lfnst_disabled_flag and the scaling list parameter for the luminance signal.

When the chroma_aps_present_flag is true ("1"), the scaling list parameter (scaling_list_data) includes the scaling list parameter for the chrominance signal. On the other hand, when the chroma_aps_present_flag is false ("0"), the scaling list parameter (scaling_list_data) does not include the scaling list parameter for the chrominance signal. Thus, a signaling amount can be reduced. For example, when the chroma format is 4:0:0 (monochrome), by setting the chroma_aps_present_flag to be false ("0"), signaling corresponding to the scaling list parameter for the chrominance signal can be reduced.

In this way, the encoding device 1 according to the present embodiment includes the quantizer 122 that performs the quantization process, the loop filter 160 that performs the ALF process, and the entropy encoder 130 that outputs the bit stream including the APS. The APS includes the aps_params_type indicating which parameter of parameter candidates including one of the scaling list parameter including the parameter of the scaling list that controls the quantization process and the ALF parameter including the parameter of the filter coefficient used in the ALF process is included in the APS, and the chroma_aps_present_flag indicating whether or not the parameter for the chrominance signal is present in the APS. The chroma_aps_present_flag is applied in common to the scaling list parameter and the ALF parameter.

The entropy encoder 130 according to the present embodiment outputs the APS not including the scaling list parameter for the chrominance signal and the ALF parameter for the chrominance signal, as the chroma_aps_present_flag indicating that the parameter for the chrominance signal is present in the APS (chroma_aps_present_flag="1") is not included in the APS, that is chroma_aps_present_flag="0" is included in the APS.

The entropy encoder 130 according to the present embodiment outputs the APS not including the chrominance filter parameter present flag indicating whether or not the ALF parameter for the chrominance signal is present in the APS, as the chroma_aps_present_flag indicating that the parameter for the chrominance signal is present in the APS (chroma_aps_present_flag="1") is not included in the APS, that is chroma_aps_present_flag="0" is included in the APS.

Further, the entropy encoder 130 according to the present embodiment outputs the APS including at least one of the scaling list parameter for the chrominance signal and the chrominance filter parameter present flag, as the chroma_aps_present_flag indicating that the parameter for the chrominance signal is present in the APS (chroma_aps_present_flag="1") is included in the APS.

<Decoding Device>

Next, the decoding device according to the present embodiment will be described focusing mainly on differences from the encoding device 1.

(Configuration of Decoding Device)

Figure 8:
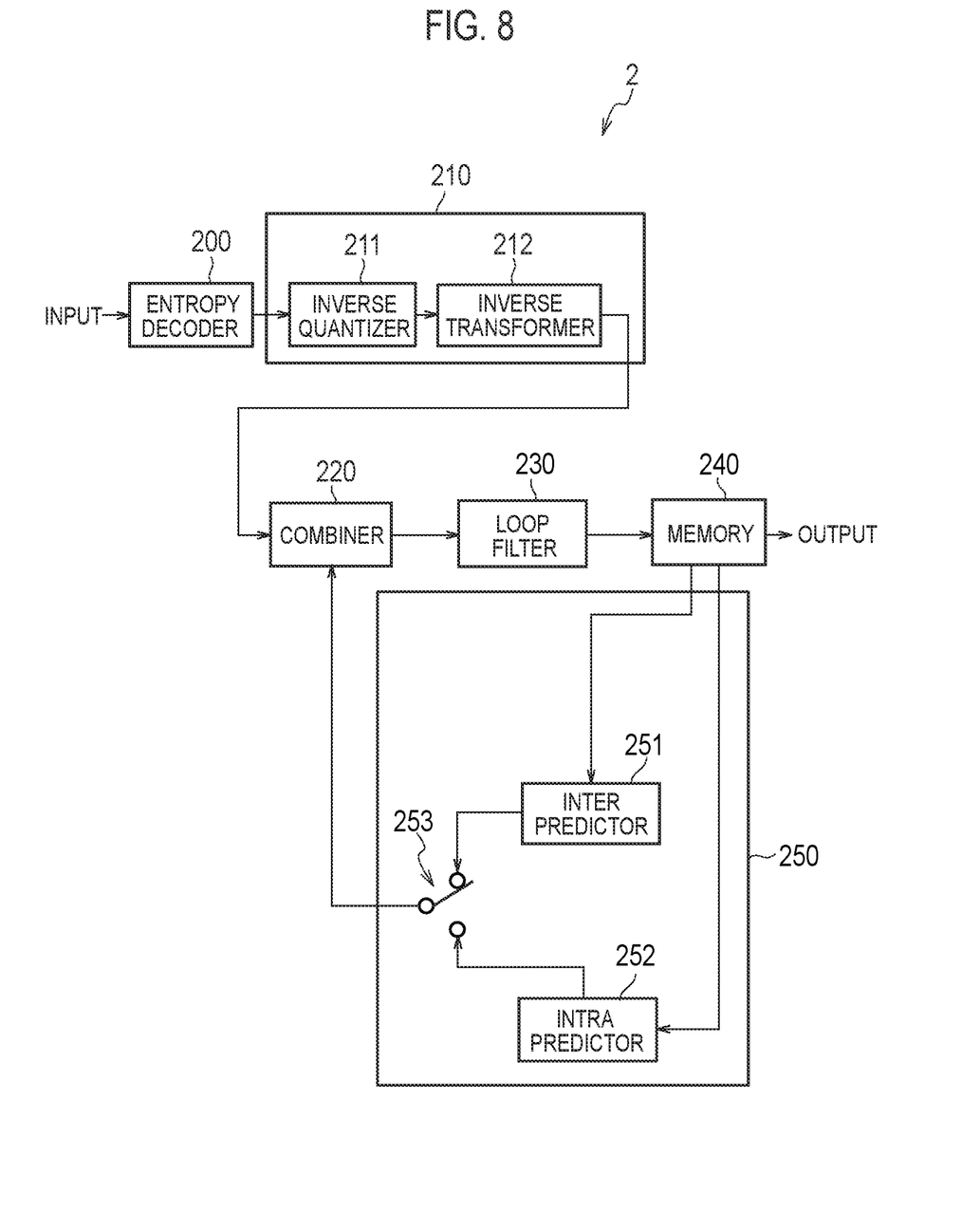
FIG. 8 is a diagram illustrating a configuration of a decoding device according to the embodiment.

FIG. 8 is a diagram illustrating a configuration of a decoding device 2 according to the present embodiment.

As illustrated in FIG. 8, the decoding device 2 includes an entropy decoder 200, an inverse quantizer/inverse transformer 210, a combiner 220, a loop filter 230, a memory 240, and a predictor 250.

The entropy decoder 200 decodes the encoded data (bit stream) and outputs the quantized transform coefficients corresponding to a decoding-target block to the inverse quantizer/inverse transformer 210. In addition, the entropy decoder 200 acquires the information regarding the transform process and the quantization process and outputs the information regarding the transform process and the quantization process to the inverse quantizer/inverse transformer 210. Further, the entropy decoder 200 acquires the information regarding the prediction process and outputs the information regarding the prediction process to the predictor 250.

The inverse quantizer/inverse transformer 210 executes an inverse quantization process and an inverse transform process on each of blocks. The inverse quantizer/inverse transformer 210 includes an inverse quantizer 211 and an inverse transformer 212.

The inverse quantizer 211 performs the inverse quantization process corresponding to the quantization process performed by the quantizer 122 of the encoding device 1. The inverse quantizer 211 inverse-quantizes the quantized transform coefficients outputted from the entropy decoder 200 by using the quantization parameter (Qp) and the quantization matrix to restore transform coefficients in the decoding-target block, and outputs the restored transform coefficients to the inverse transformer 212. Here, the scaling list that is a list including the values constituting the quantization matrix is outputted from the entropy decoder 200 to the inverse transformer 212. Note that the scaling list for the luminance signal and the scaling list for the chrominance signal can be set so as to be different from each other.

The inverse transformer 212 performs the inverse transform process corresponding to the transform process performed by the transformer 121 of the encoding device 1. The inverse transformer 212 restores the prediction residual by performing the inverse transform process on the transform coefficients outputted from the inverse quantizer 211, and outputs the restored prediction residual (restoration prediction residual) to the combiner 220.

The combiner 220 decodes (reconstructs) an original block by combining the prediction residual outputted from the inverse transformer 212 and a prediction block outputted from the predictor 250 in pixel units, and outputs the decoded block to the loop filter 230.

The loop filter 230 performs the filter process on the decoded block outputted from the combiner 220 and outputs the decoded block after the filter process to the memory 240. In the present embodiment, the loop filter 230 performs the adaptive loop filter (ALF) process. The loop filter 230 can be set to perform the ALF process using the filter coefficients different from each other for the luminance signal and the chrominance signal. The ALF process for the chrominance signal includes the CCALF (Cross-component ALF) that is the ALF process using the color correlation in the chrominance signal. The CCALF includes the CCALF on the first component (Cb signal) of the chrominance signal and the CCALF on the second component (Cr signal) of the chrominance signal. The filter coefficients used in the ALF process are outputted from the entropy decoder 200 to the loop filter 230. Note that the filter coefficient for the luminance signal and the filter coefficient for the chrominance signal can be set so as to be different from each other.

The memory 240 stores the decoded block outputted from the combiner 220 and accumulates the decoded block as decoded images in frame units. The memory 240 outputs the decoded block or the decoded images to the predictor 250. In addition, the memory 240 outputs the decoded images in frame units to the outside of the decoding device 2.

The predictor 250 performs prediction in units of blocks. The predictor 250 includes an inter predictor 251, an intra predictor 252 and a switcher 253.

The inter predictor 251 performs the inter prediction utilizing the inter-frame correlation. Specifically, the inter predictor 251 generates the inter prediction block by predicting the encoding-target block by using the decoded image stored in the memory 240 as the reference image based on the information regarding the inter prediction (for example, motion vector information) outputted from the entropy decoder 200, and outputs the generated inter prediction block to the switcher 253.

The intra predictor 252 performs the intra prediction utilizing the intra-frame spatial correlation. Specifically, the intra predictor 252 generates the intra prediction block by referring to the decoded pixels present around the encoding-target block of the decoded image stored in the memory 240 using the intra prediction mode according to the information regarding the intra prediction (for example, intra prediction mode information) outputted from the entropy decoder 200, and outputs the generated intra prediction block to the switcher 253.

The switcher 253 switches the prediction block between the inter prediction block outputted from the inter predictor 251 and the intra prediction block outputted from the intra predictor 252 and outputs one of the prediction blocks to the combiner 220.

The decoding device 2 may include a functional unit for performing the LMCS process.

(Operation of Decoding Device)

Next, an operation of the decoding device 2 according to the present embodiment will be described.

The decoding device 2 includes, as described above, the inverse quantizer 211 that performs the inverse quantization process, the loop filter 230 that performs the ALF process, and the entropy decoder 200 that acquires the bit stream including the adaptation parameter set (APS).

As illustrated in FIG. 5, adaptation_parameter_set_rbsp( ) of the APS includes the adaptation_parameter_set_id that is the ID of the APS, the chroma_aps_present_flag that is the flag indicating whether or not the parameter for the chrominance signal is present in the APS, and the aps_params_type that is the information indicating a type of the encoding tool (function) for which the parameter is included in the APS. In the present embodiment, the chroma_aps_present_flag corresponds to the chrominance parameter present flag.

When the aps_params_type is "ALF_APS", the entropy decoder 200 interprets that the APS includes the ALF parameter (alf_data) including the parameter of the filter coefficient used in the ALF process. To the ALF parameter (alf_data), the chroma_aps_present_flag is applied. Specifically, the chroma_aps_present_flag is applied as an argument to the ALF parameter (alf_data). The entropy decoder 200 interprets the contents of the ALF parameter (alf_data) according to whether the chroma_aps_present_flag is true ("1") or false ("0"). In the present embodiment, an example of applying the chroma_aps_present_flag as an argument of the ALF parameter (alf_data) is described, however, the configuration may be such that the decoded chroma_aps_present_flag is held in the decoding device 2 (for example, the entropy decoder 200) and referred to in the ALF parameter (alf_data). For example, the configuration may be such that the value of the decoded chroma_aps_present_flag is stored in the area ChromaApsPresentFlag in the memory of the decoding device 2 and the contents of the ALF parameter (alf_data) are changed by referring to the ChromaApsPresentFlag in decoding of the ALF parameter (alf_data).

When the aps_params_type is "LMCS_APS", the entropy decoder 200 interprets that the APS includes the LMCS parameter (lmcs_data) including the parameter for controlling the LMCS process.

When the aps_params_type is "SCALING_APS", the entropy decoder 200 interprets that the APS includes the scaling list parameter (scaling_list_data) including the parameter of the scaling list that controls the quantization process. To the scaling list parameter (scaling_list_data), the chroma_aps_present_flag is applied. Specifically, the chroma_aps_present_flag is applied as an argument to the scaling list parameter (scaling_list_data). The entropy decoder 200 interprets the contents of the scaling list parameter (scaling_list_data) according to whether the chroma_aps_present_flag is true ("1") or false ("0"). In the present embodiment, an example of applying the chroma_aps_present_flag as an argument of the scaling list parameter (scaling_list_data) is described, however, the configuration may be such that the decoded chroma_aps_present_flag is held in the decoding device 2 (for example, the entropy decoder 200) and referred to in the scaling list parameter (scaling_list_data). For example, the configuration may be such that the value of the decoded chroma_aps_present_flag is stored in the area ChromaApsPresentFlag in the memory of the decoding device 2 and the contents of the scaling list parameter (scaling_list_data) are changed by referring to the ChromaApsPresentFlag in decoding of the scaling list parameter (scaling_list_data).

In this way, in the present embodiment, the chroma_aps_present_flag that is the flag indicating whether or not the parameter for the chrominance signal is present in the APS is applied in common to the ALF parameter (alf_data) and the scaling list parameter (scaling_list_data).

As illustrated in FIG. 6, the ALF parameter (alf_data) includes the alf_luma_filter_signal_flag indicating whether or not the ALF parameter for the luminance signal is present in the APS. The alf_luma_filter_signal_flag is a 1-bit flag that is present regardless of the chroma_aps_present_flag.

The entropy decoder 200 interprets that the three flags indicating whether or not the ALF parameter for the chrominance signal is present in the APS are included when the chroma_aps_present_flag is true ("1"). The three flags correspond to the chrominance filter parameter present flags.

Specifically, the three flags are the alf chroma_filter_signal_flag indicating whether or not to apply the ALF to the chrominance signal, the alf_cc_cb_filter_signal_flag indicating whether or not to apply the ALF (CCALF) using the color correlation to the Cb signal of the chrominance signal and the alf_cc_cr_filter_signal_flag indicating whether or not to apply the CCALF to the Cr signal of the chrominance signal.

On the other hand, when the chroma_aps_present_flag is false ("0"), the entropy decoder 200 interprets that the three flags indicating whether or not the ALF parameter for the chrominance signal is present in the APS are not included.

As illustrated in FIG. 7, the scaling list parameter (scaling_list_data) includes the scaling_matrix_for_lfnst_disabled_flag and the scaling list parameter for the luminance signal.

When the chroma_aps_present_flag is true ("1"), the entropy decoder 200 interprets that the scaling list parameter (scaling_list_data) includes the scaling list parameter for the chrominance signal. On the other hand, when the chroma_aps_present_flag is false ("0"), the entropy decoder 200 interprets that the scaling list parameter (scaling_list_data) does not include the scaling list parameter for the chrominance signal.

In this way, the decoding device 2 according to the present embodiment includes the entropy decoder 200 that acquires the bit stream including the APS, the inverse quantizer 211 that performs the inverse quantization process, and the loop filter 230 that performs the ALF process. The APS includes the aps_params_type indicating which parameter of the parameter candidates including one of the scaling list parameter including the parameter of the scaling list that controls the inverse quantization process and the ALF parameter including the parameter of the filter coefficient used in the ALF process is included in the APS, and the chroma_aps_present_flag indicating whether or not the parameter for the chrominance signal is present in the APS. The chroma_aps_present_flag is applied in common to the scaling list parameter and the ALF parameter.

The entropy decoder 200 according to the present embodiment interprets that the scaling list parameter for the chrominance signal and the ALF parameter for the chrominance signal are not included in the APS, as the chroma_aps_present_flag indicating that the parameter for the chrominance signal is present in the APS (chroma_aps_present_flag="1") is not included in the APS, that is chroma_aps_present_flag="0" is included in the APS.

The entropy decoder 200 according to the present embodiment interprets that the chrominance filter parameter present flag indicating whether or not the ALF parameter for the chrominance signal is present in the APS is not included in the APS, as the chroma_aps_present_flag indicating that the parameter for the chrominance signal is present in the APS (chroma_aps_present_flag="1") is not included in the APS, that is chroma_aps_present_flag="0" is included in the APS.

The entropy decoder 200 according to the present embodiment interprets that at least one of the scaling list parameter for the chrominance signal and the chrominance filter parameter present flag is included in the APS, as the chroma_aps_present_flag indicating that the parameter for the chrominance signal is present in the APS (chroma_aps_present_flag="1") is included in the APS.

<Other Embodiments>

In the embodiment described above, whether or not the parameter for the chrominance signal of the parameter regarding the ALF and the parameter regarding the ScalingList is included in the stream is controlled according to the chroma_aps_present_flag. However, the APS may be configured as illustrated in FIG. 9.

Figure 9:
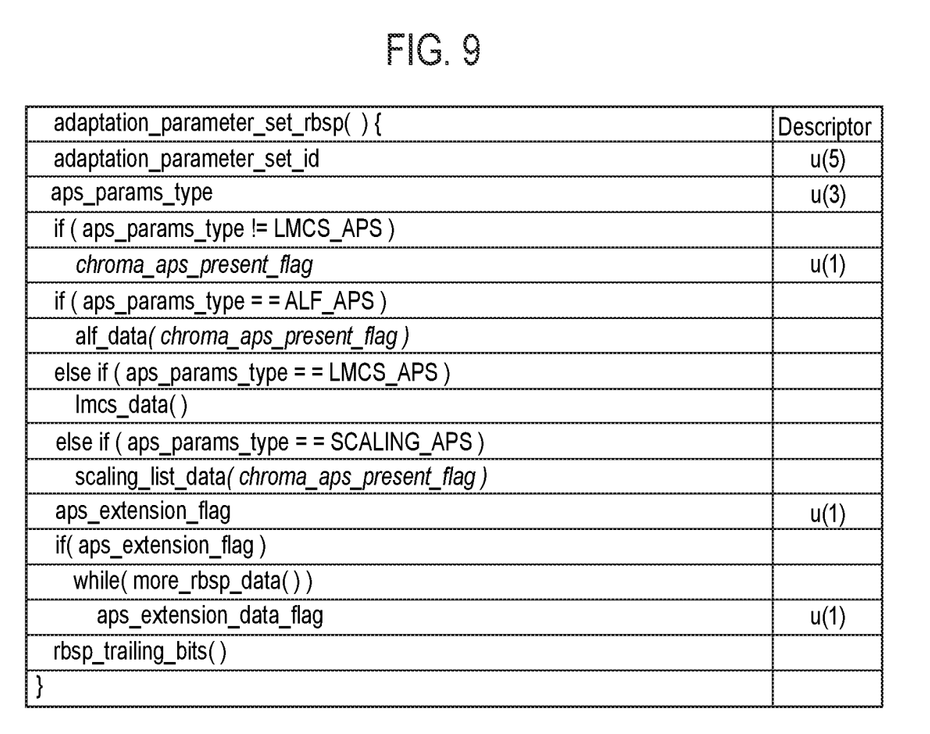
FIG. 9 is a diagram illustrating the APS according to another embodiment.

As illustrated in FIG. 9, the entropy encoder 130 may control whether or not to include the chroma_aps_present_flag in the APS according to the aps_params_type. In an example illustrated in FIG. 9, the entropy encoder 130 performs control so as to send the chroma_aps_present_flag in the case of the type of sending the parameter for the chrominance signal among parameter types of the APS, and not to send the chroma_aps_present_flag otherwise. In addition, the entropy decoder 200 interprets that the chroma_aps_present_flag is included in the APS in the case of the type of sending the parameter for the chrominance signal among the parameter types of the APS, and interprets that the chroma_aps_present_flag is not included in the APS otherwise.

While there is a parameter for chrominance for the ALF and the ScalingList, the parameter for the chrominance is not sent for the LMCS. Therefore, by performing the control so as not to send the chroma_aps_present_flag for the LMCS, the need for redundant bit signaling in the LMCS is eliminated.

Then, the entropy encoder 130 may perform the control so as not to include the parameter for the chrominance signal of the ALF and the ScalingList in the stream when the chroma_aps_present_flag is included in the APS and when the chroma_aps_present_flag is "0", and may perform the control so as to include the parameter for the chrominance signal of the ALF and the ScalingList in the stream when the chroma_aps_present_flag is "1".

A program may be provided to cause a computer to execute the operations of the image encoding device 1. A program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example.

The encoding device 1 may be embodied as a semiconductor integrated circuit (chipset, SoC, etc.) by integrating the circuits that execute the respective operations of the encoding device 1. The decoding device 2 may be embodied as a semiconductor integrated circuit (chipset, SoC, etc.) by integrating the circuits that execute the respective operations of the decoding device 2.

The embodiments have been described in detail above with reference to the drawings. Specific configurations are not limited to the above-described configurations, and various design changes, and the like are possible within the scope not deviating from the gist.

The invention claimed is:
1. An encoding device comprising:
a quantizer configured to perform a quantization process;
a loop filter configured to perform an adaptive loop filter process; and
an entropy encoder configured to output a bit stream including an adaptive parameter set, wherein
the adaptive parameter set includes
encoding tool type information indicating which parameter of parameter candidates including one of a scaling list parameter including a parameter of a scaling list that controls the quantization process and an adaptive loop filter parameter including a parameter of a filter coefficient used in the adaptive loop filter process is included in the adaptive parameter set, and a chrominance parameter present flag indicating whether or not a parameter for a chrominance signal is present in the adaptive parameter set, the chrominance parameter present flag is applied in common to the scaling list parameter and the adaptive loop filter parameter, wherein when the encoding tool type information indicating the adaptive loop filter parameter, the entropy encoder is configured to     in response to including, into the adaptive parameter set, the chrominance parameter present flag indicating that the parameter for the chrominance signal is not present in the adaptive parameter set, output the adaptive parameter set not including a first flag and a second flag, the first flag indicating whether to apply an adaptive loop filter using color correlation to a Cb signal among the chrominance signal, the second flag indicating whether to apply an adaptive loop filter using color correlation to a Cr signal among the chrominance signal, and     in response to including, into the adaptive parameter set, the chrominance parameter present flag indicating that the parameter for the chrominance signal is present in the adaptive parameter set, output the adaptive parameter set including the first flag and the second flag.

2. A non-transitory computer-readable storage medium with an executable program stored thereon, wherein the program causes a computer to function as the encoding device according to claim 1.

3. A decoding device comprising:

an entropy decoder configured to acquire a bit stream including an adaptive parameter set;

an inverse quantizer configured to perform an inverse quantization process; and a loop filter configured to perform an adaptive loop filter process, wherein the adaptive parameter set includes encoding tool type information indicating which parameter of parameter candidates including one of a scaling list parameter including a parameter of a scaling list that controls the inverse quantization process and an adaptive loop filter parameter including a parameter of a filter coefficient used in the adaptive loop filter process is included in the adaptive parameter set, and a chrominance parameter present flag indicating whether or not a parameter for a chrominance signal is present in the adaptive parameter set, the chrominance parameter present flag is applied in common to the scaling list parameter and the adaptive loop filter parameter, wherein when the encoding tool type information indicating the adaptive loop filter parameter, the entropy decoder is configured to     in response to the chrominance parameter present flag indicating that the parameter for the chrominance signal is not present in the adaptive parameter set, interpret that a first flag and a second flag are not present in the adaptive parameter set, the first flag indicating whether to apply an adaptive loop filter using color correlation to a Cb signal among the chrominance signal, the second flag indicating whether to apply an adaptive loop filter using color correlation to a Cr signal among the chrominance signal, and     in response to the chrominance parameter present flag indicating that the parameter for the chrominance signal is present in the adaptive parameter set, interpret that the first flag and the second flag are present in the adaptive parameter set.

4. A non-transitory computer-readable storage medium with an executable program stored thereon, wherein the non-transitory computer-readable storage medium with an executable program stored thereon, wherein the program causes a computer to function as the decoding device according to claim 3.

* * * * *